(12) United States Patent
Ogawa et al.

(10) Patent No.: US 10,349,458 B2
(45) Date of Patent: Jul. 9, 2019

(54) WIRELESS COMMUNICATION DEVICE AND WIRELESS COMMUNICATION METHOD FOR PERFORMING A PLURALITY OF WIRELESS COMMUNICATIONS BY PERFORMING TIME DIVISION MULTIPLEXING

(71) Applicant: SEIKO EPSON CORPORATION, Tokyo (JP)

(72) Inventors: Yohei Ogawa, Nagano (JP); Taichi Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 14/813,633

(22) Filed: Jul. 30, 2015

(65) Prior Publication Data

US 2016/0066361 A1 Mar. 3, 2016

(30) Foreign Application Priority Data

Aug. 27, 2014 (JP) ................. 2014-172395

(51) Int. Cl.
| | |
|---|---|
| *H04W 76/15* | (2018.01) |
| *H04W 72/04* | (2009.01) |
| *H04B 7/14* | (2006.01) |
| *H04J 3/16* | (2006.01) |
| *H04W 76/14* | (2018.01) |
| *H04W 88/04* | (2009.01) |

(52) U.S. Cl.
CPC ............. *H04W 76/15* (2018.02); *H04B 7/14* (2013.01); *H04J 3/1694* (2013.01); *H04W 72/0453* (2013.01); *H04W 76/14* (2018.02); *H04W 88/04* (2013.01)

(58) Field of Classification Search
CPC ............. H04W 76/025; H04W 76/023; H04W 72/0453; H04B 7/14; H04J 3/1694
See application file for complete search history.

(56) References Cited

U.S. PATENT DOCUMENTS

| | | | |
|---|---|---|---|
| 2008/0008132 A1 | 1/2008 | Ushiki et al. | |
| 2009/0303945 A1* | 12/2009 | Tanigawa | ................ H04L 5/023 370/329 |
| 2012/0082077 A1* | 4/2012 | Zhang | ............... H04W 72/1215 370/311 |

(Continued)

FOREIGN PATENT DOCUMENTS

| | | |
|---|---|---|
| JP | 2006-173946 A | 6/2006 |
| JP | 2008-017317 A | 1/2008 |

(Continued)

*Primary Examiner* — Ricky Q Ngo
*Assistant Examiner* — Stephen N Steiner

(57) ABSTRACT

A wireless communication device includes a wireless communication unit that performs a plurality of wireless communications using different channels by switching the wireless communications by performing time division multiplexing, and a control unit that causes the wireless communication unit to perform a first wireless communication for wirelessly communicating via a relay device and a second wireless communication for wirelessly communicating with a wireless terminal through a Peer to Peer system. The control unit controls the wireless communication unit to use the same channel as a channel to be used in the first wireless communication and perform the second wireless communication.

12 Claims, 5 Drawing Sheets

(56) References Cited

U.S. PATENT DOCUMENTS

| | | | |
|---|---|---|---|
| 2012/0265913 A1* | 10/2012 | Suumaki | H04W 4/008 |
| | | | 710/303 |
| 2013/0034082 A1* | 2/2013 | Etemad | H04W 36/14 |
| | | | 370/331 |
| 2013/0065627 A1* | 3/2013 | Jung | H04L 67/104 |
| | | | 455/515 |
| 2013/0148161 A1* | 6/2013 | Park | G06F 3/1296 |
| | | | 358/1.15 |
| 2013/0196702 A1 | 8/2013 | Shibata | |
| 2014/0179317 A1 | 6/2014 | Tanaka | |

FOREIGN PATENT DOCUMENTS

| | | |
|---|---|---|
| JP | 2013-157943 A | 8/2013 |
| JP | 2014-127871 A | 7/2014 |

\* cited by examiner

WIRELESS COMMUNICATION DEVICE AND WIRELESS COMMUNICATION METHOD FOR PERFORMING A PLURALITY OF WIRELESS COMMUNICATIONS BY PERFORMING TIME DIVISION MULTIPLEXING

CROSS REFERENCES TO RELATED APPLICATIONS

This application claims priority to Japanese Application No. 2014-172395, filed Aug. 27, 2014, the entirety of which is incorporated by reference herein.

BACKGROUND

1. Technical Field

The present invention relates to a wireless communication device and a wireless communication method.

2. Related Art

There have been known wireless communication devices having functions of Wi-Fi wireless communication and Wi-Fi Direct wireless communication (for example, JPA-2014-127871).

JP-A-2014-127871 discloses that, under a restriction that a channel used in Wi-Fi wireless communication needs to be consistent with a channel used in Wi-Fi Direct wireless communication, two types of wireless communication are performed, with the former and the latter being consistent with each other. In JP-A-2014-127871, however, no reference is made to a control scheme for an environment where different channels can be used for Wi-Fi and Wi-Fi Direct.

SUMMARY

An advantage of some aspects of the invention is to provide a technique for controlling Wi-Fi wireless communication and Wi-Fi Direct wireless communication in an environment where different channels can be used for Wi-Fi wireless communication and Wi-Fi Direct wireless communication.

According to an aspect of the invention, a wireless communication device includes a wireless communication unit that performs a plurality of wireless communications using different channels by switching the wireless communications by performing time division multiplexing, and a control unit that causes the wireless communication unit to perform a first wireless communication for wirelessly communicating via a relay device and a second wireless communication for wirelessly communicating with a wireless terminal through a Peer to Peer system. The control unit controls the wireless communication unit to use the same channel as a channel to be used in the first wireless communication and perform the second wireless communication.

The second wireless communication is performed on the same channel as that used in the first wireless communication, so that the likelihood of a decrease in transmission speeds of the first and second wireless communications can be reduced compared to the case where respective wireless communications are performed by the time division multiplexing system using different channels. For example, when the time division multiplexing system is employed and a unit time period T corresponding to one frame is shared by two channels A and B and when each allocation time period for each channel is assumed to be approximately T/2, the maximum data amount that is transmittable on channel A within the allocation time period (T/2) is approximately ½ the maximum data amount that is transmittable when the whole unit time period T can be used for communication on channel A (the same applies to channel B). That is, the maximum value of the transmission speed of channel A in the unit time period T when the communications of the two channels are time-division-multiplexed is approximately ½ the maximum value of the transmission speed of channel A in the unit time period T when time division multiplexing is not applied. Thus, time division multiplexing of the first and second wireless communications on different channels may result in an undesirable reduction in transmission speed in a situation where it is expected that a simultaneous increase in the transmission amount of the first and second wireless communications occurs less frequently and that, when one of the first and second wireless communications is being performed, the other is usually not being performed. Therefore, the use of the same channel for the first and second wireless communications decreases the likelihood of an undesirable decrease in the transmission speed of each communication.

Moreover, in the wireless communication device according to the aspect of the invention, it is preferable that, when a connection to the relay device through the first wireless communication is newly established in a state where a connection to the wireless terminal through the second wireless communication has been established and when a channel being used in the second wireless communication is different from a channel to be newly used in the first wireless communication, the control unit cause the wireless communication unit to switch a channel to be used in the second wireless communication to the same channel as the channel to be used in the first wireless communication. Further, it is preferable that, when the connection to the relay device through the first wireless communication is newly established in the state where the connection to the wireless terminal through the second wireless communication has been established and when the channel being used in the second wireless communication is the same as the channel to be newly used in the first wireless communication, the control unit cause the wireless communication unit to maintain the connection to the wireless terminal without resetting the channel to be used in the second wireless communication.

That is, when the connection of the first wireless communication is newly established in a state where the connection of the second wireless communication has been established, the control unit applies control of switching the channel of the second wireless communication only when the channel of the second wireless communication is different from the channel of the first wireless communication. The switching of the channel of the second wireless communication causes disconnection of the connection to the wireless terminal. Thus, the control unit controls the wireless communication unit not to reset the channel when switching of the channel is unnecessary so that undesirable disconnection can be prevented.

Moreover, in the wireless communication device according to the aspect of the invention, it is preferable that the control unit record a value of the channel to be used in the first wireless communication when the first wireless communication is performed and, when the connection to the wireless terminal through the second wireless communication is newly established in a state where the connection to the relay device through the first wireless communication is temporarily disconnected, control the wireless communication unit to perform the second wireless communication on the same channel as indicated by the value.

The second wireless communication is performed on the channel previously used in the first wireless communication so that the occurrence of a disconnection of the second wireless communication due to the above-described channel switching can be suppressed when the connection to the relay device by the first wireless communication is reestablished.

Moreover, in the wireless communication device according to the aspect of the invention, it is preferable that, when it is not determined that a communication on the channel to be used in the first wireless communication is congested to a predetermined threshold or higher, the control unit control the wireless communication unit to use the same channel as the channel to be used in the first wireless communication and perform the second wireless communication. Further, it is preferable that, when it is determined that the communication in the channel to be used in the first wireless communication is congested to the threshold or higher, the control unit control the wireless communication unit to use a different channel from the channel to be used in the first wireless communication and perform the second wireless communication.

When the communications on the channel used in the first wireless communication are congested and the second wireless communication is performed in the same channel, the communications in the channel may be further congested, and the transmission speed of any one of the first wireless communication and the second wireless communication is likely to significantly decrease. Thus, the channels are separated for the first wireless communication and the second wireless communication, and the wireless communication unit is configured to apply the time division multiplexing thereto, which can prevent a significant decrease in the transmission speed of any one of the communications.

Moreover, in the wireless communication device according to the aspect of the invention, it is preferable that, when the wireless communication unit performs time division multiplexing of a plurality of channels and when a ratio of a transmission amount within a current frame of a first channel that is one of the plurality of channels to a total transmission amount within the current frame of all the plurality of channels increases to a predetermined reference value or higher, the wireless communication unit increase a ratio of an allocation time period for the first channel within a next frame to a whole time period of the next frame.

In the time division multiplexing, the allocation time period allocated to each channel within one frame is made variable in accordance with the degree of congestion of the communication of each channel, which allows for efficient communication in each channel. Note that the length of one frame is controlled to be constant in the time division multiplexing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in the following order with reference to the drawings. Note that, in the respective drawings, the same numbers are provided to corresponding elements, and duplicated description thereof will be omitted.

1. First Embodiment 1-1. Configuration

Figure 1:
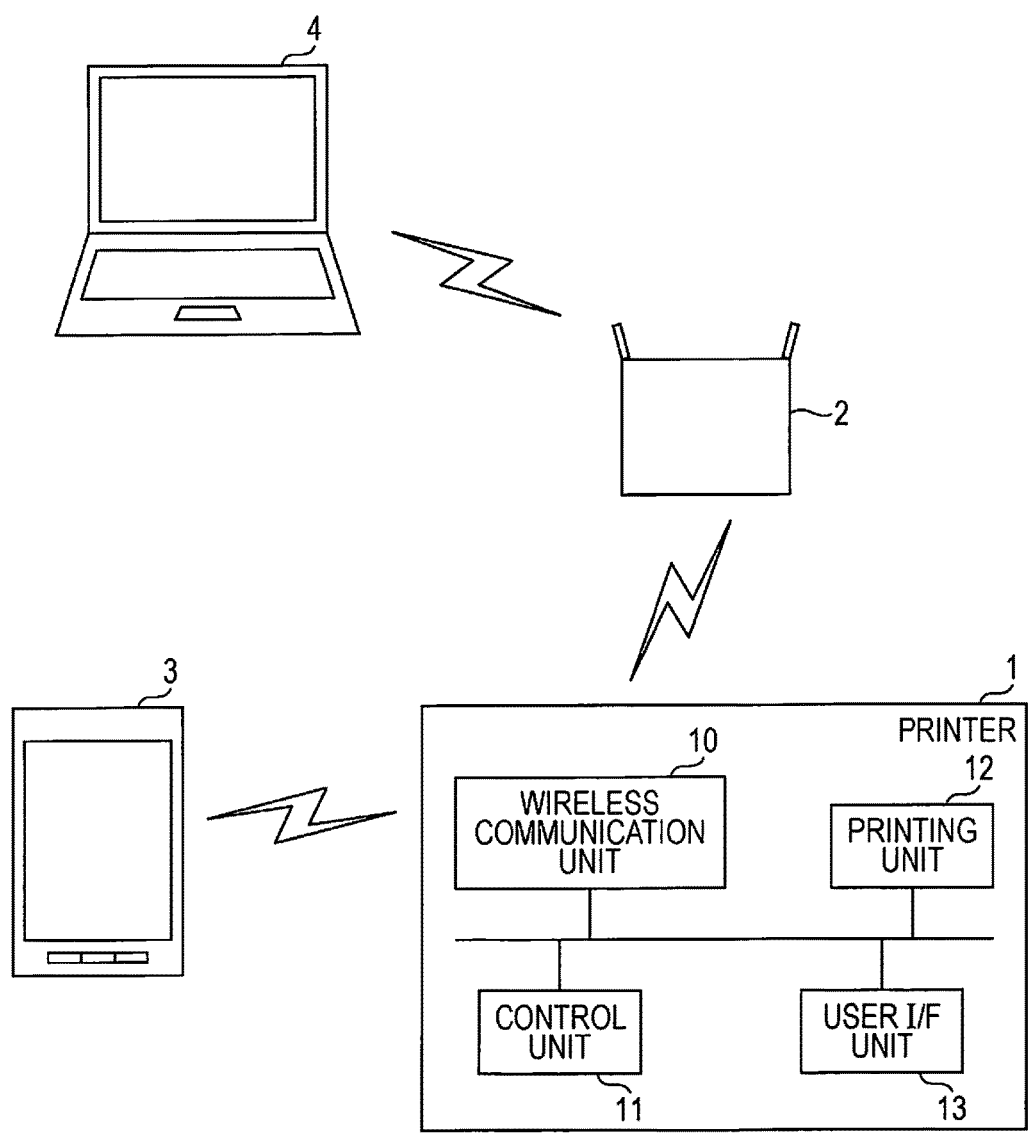
FIG. 1 is a block diagram of an embodiment of the invention.

FIG. 1 is a block diagram illustrating a printer 1 as a wireless communication device of the embodiments of the invention. The printer 1 is able to wirelessly communicate with a personal computer (PC) 4 by Wi-Fi via an access point (AP) 2 as a relay device (the first wireless communication). Further, the printer 1 is able to wirelessly communicate with a smartphone 3 as a wireless terminal by Wi-Fi Direct (hereafter, referred to as "WFD") (the second wireless communication).

The printer 1 includes a wireless communication unit 10, a control unit 11, a printing unit 12, and a user I/F unit 13. The control unit 11 includes a CPU, a non-volatile memory, a RAM, an ASIC, and so on and is able to control each unit of the printer 1 by causing the CPU to execute various programs such as a communication control program and a print control program stored in the non-volatile memory. The communication control program includes a program that implements a channel control process at a later-described WFD startup, a program that implements a channel control process at Wi-Fi startup during the WFD connection, and so on. The print control program is a program for controlling each unit of the printing unit 12 to realize a print function.

The wireless communication unit 10 includes, for example, a radio frequency (RF) unit, a baseband signal processing unit, and so on. The RF unit is connected to an antenna not shown, and radio signals that are transmitted using carriers of various frequency bands via the antenna are received and demodulated into baseband signals. Further, the RF unit modulates baseband signals to transmit them as radio signals using carriers of various frequency bands via the antenna. The baseband signal processing unit includes a protocol stack processing circuit and the like, and converts transmission data inputted from the control unit 11 into the baseband signals and outputs them to the RF unit. Further, the baseband signal processing unit converts the baseband signals inputted from the RF unit to generate received data and outputs them to the control unit 11.

The RF unit, the baseband signal processing unit, and the like enable the wireless communication unit 10 to implement a function of wirelessly communicating with the relay device such as the AP 2 by Wi-Fi and a function of wirelessly communicating with other wireless terminals by WFD in a P2P system without interposing a relay device. Further, the wireless communication unit 10 has a function of controlling the communications of a plurality of channels by using the time division multiplexing system. In the present specification, the term channel refers to a frequency band utilized in wireless communications. The wireless communication unit 10 is able to switch the channels used in the WFD communication in response to an instruction of the control unit 11. Further, in response to an inquiry from the control unit 11, the wireless communication unit 10 is able to pass to the control unit 11 various pieces of status information of the wireless communication made by the wireless communication unit 10 such as information of channels in use or channels not in use.

In the present embodiment, the wireless communication unit 10 supports Wi-Fi wireless communication in the 2.4 GHz band in accordance with IEEE802.11n. The number of available channels in the 2.4 GHz band in accordance with IEEE802.11n is 13. Further, the wireless communication unit 10 also supports WFD wireless communication in the 2.4 GHz band. In a Wi-Fi communication interposing the AP 2, since the channel is determined by the AP 2, the wireless communication unit 10 of the printer 1 communicates with the AP 2 on the channel designated by the AP 2. On the other hand, in a WFD communication with the smartphone 3 without interposing the AP, the printer 1 can provisionally function as the AP after a predetermined negotiation defined by the WFD specification is performed. Therefore, when the printer 1 functions as the provisional AP in WFD communication, the printer 1 is able to determine the channel to be used.

The printing unit 12 includes an actuator, a sensor, a driving circuit, and/or mechanical parts for executing printing onto a print medium such as photo paper, plain paper, an OHP sheet, and the like by using a known printing system such as an inkjet system, an electronic photographic system, and the like. The user I/F unit 13 is an operation panel formed of a touch panel display, operation keys, and the like.

1-2. Channel Control

Channel Control at WFD Startup

Figure 2:
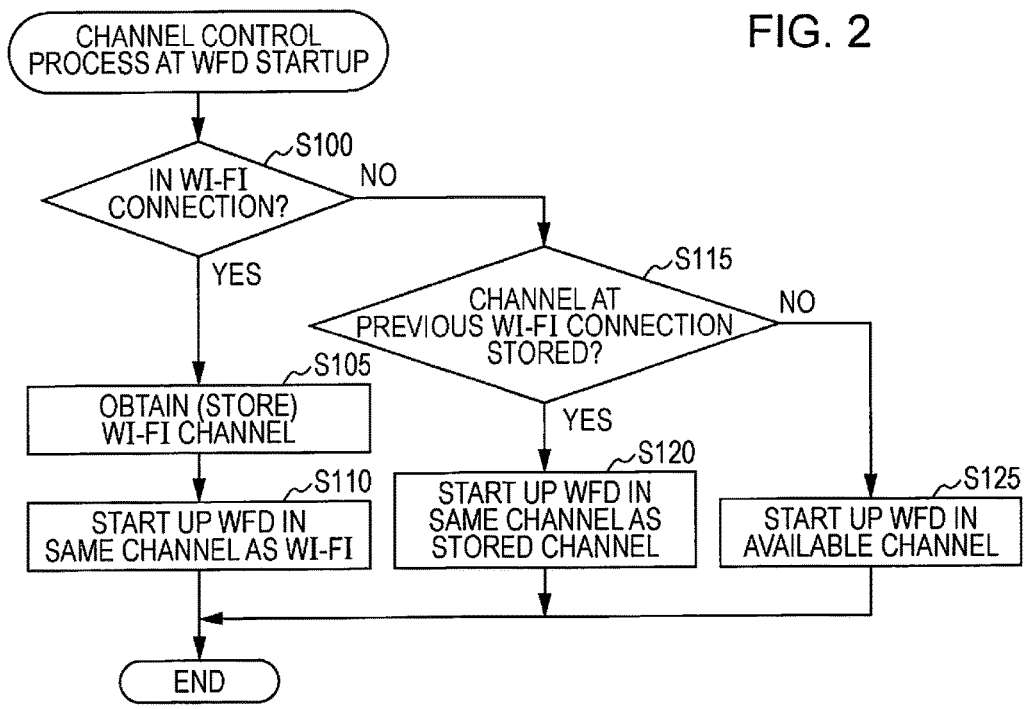
FIG. 2 is a flowchart illustrating a channel control process of a first embodiment.

Next, with reference to a flowchart of FIG. 2, a process executed by the control unit 11 when the printer 1 newly establishes WFD wireless communication with the smartphone 3 (a channel control process at WFD startup) will be described. This process is started upon the user operating the user I/F unit 13 of the printer 1 to select the WFD startup, for example. First, the control unit 11 determines whether or not a Wi-Fi communication connection is established (step S100). Specifically, the control unit 11 obtains information indicating Wi-Fi connection status from the wireless communication unit 10 and makes the determination based on this information, for example. If it is determined that a Wi-Fi connection has been established at step S100, the control unit 11 obtains from the wireless communication unit 10 the value of the channel used in the Wi-Fi wireless communication and stores the value in the non-volatile memory (step S105) and controls the wireless communication unit 10 to startup the WFD communication on the same channel as that used in the Wi-Fi communication (step S110). In response to the control by the control unit 11, the wireless communication unit 10 starts up the WFD communication in the same channel as that used in the Wi-Fi communication. When the user operates the smartphone 3 to select the WFD startup, a predetermined negotiation based on the WFD specification is performed between the printer 1 and the smartphone 3, and the connection between the printer 1 and the smartphone 3 is then established. Note that the Wi-Fi channel value is overwritten to the non-volatile memory at step S100.

In such a way, the WFD communication is started up in the same channel as that used in the Wi-Fi communication over a Wi-Fi connection so that the likelihood of a decrease in the transmission speeds of the Wi-Fi wireless communication and the WFD wireless communication can be reduced compared to the case where the respective wireless communications are performed in the time division multiplexing system on different channels. When only a small occurrence frequency is expected for a simultaneous increase in the transmission amounts of the Wi-Fi communication and the WFD communication, time division multiplexing of the Wi-Fi communication and the WFD communication on the different channels may result in an undesirable decrease in the transmission speed. Therefore, the use of the same channel for the Wi-Fi communication and the WFD communication allows for a reduced likelihood of an undesirable decrease in the transmission speed of each communication.

If it is not determined that a Wi-Fi connection has been established at step S100, the control unit 11 determines whether or not the channel value of the previous Wi-Fi connection has been recorded in the non-volatile memory (step S115) and, if recorded, controls the wireless communication unit 10 to start up the WFD communication in the same channel as the recorded channel (step S120). As a result, the wireless communication unit 10 starts up the WFD communication in the same channel as the channel that was used in the previous Wi-Fi communication and establishes a connection with the smartphone 3 in a similar manner to that described above.

Since the Wi-Fi channel value recorded in the non-volatile memory is overwritten, the recorded value indicates the channel value of the immediately previous Wi-Fi connection. In such a way, the channel that was used in the Wi-Fi connection is recorded, and the WFD communication is started up using the recorded channel also when the Wi-Fi connection is not active, so that the disconnection frequency of the WFD communication due to channel switching can be reduced in channel control during the WFD connection described later.

If it is not determined at step S115 that the channel value has been recorded, the control unit 11 causes the wireless communication unit 10 to search for an available (not-in-use) channel and starts up the WFD communication in the available channel (step S125). As a result, the wireless communication unit 10 starts up the WFD communication in the available channel and establishes the connection with the smartphone 3 in a similar manner to that described above.

Channel Control During WFD Connection

Figure 3:
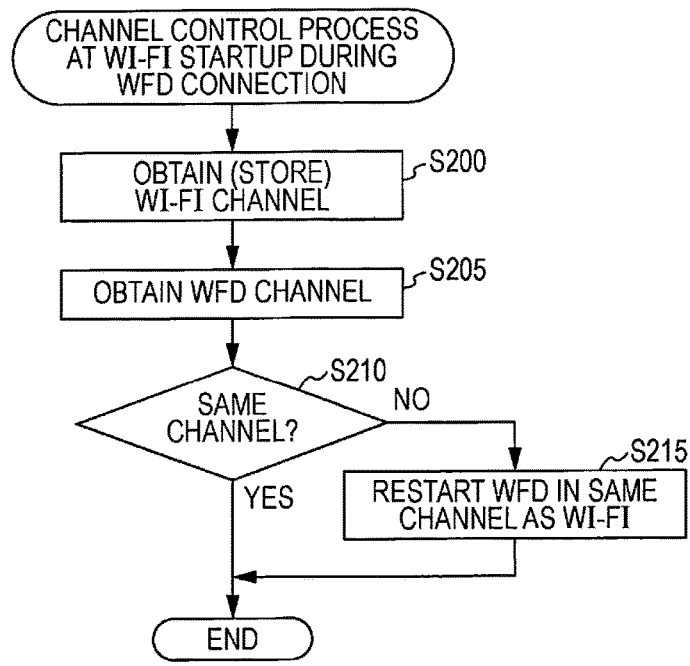
FIG. 3 is a flowchart illustrating a channel control process of the first embodiment.

Subsequently, with reference to a flowchart of FIG. 3, a channel control process executed by the control unit 11 when a Wi-Fi wireless communication connection is newly established in a state where the WFD connection to the smartphone 3 is established will be described. This process is started in a manner such as when the AP 2 is restarted during the WFD connection, for example. First, the control unit 11 obtains from the wireless communication unit 10 a channel value to be used in the Wi-Fi wireless communication and records it in the non-volatile memory (step S200). The wireless communication unit 10 makes the connection procedure with the AP 2. With respect to FIG. 3, the channel control performed by the control unit 11 will be described. The information indicating the channel to be used in the Wi-Fi communication is contained in a packet called a beacon transmitted by the AP 2, and the wireless communication unit 10 obtains the channel value based on the beacon and notifies the control unit 11 of the channel value.

Subsequently, the control unit 11 obtains from the wireless communication unit 10 the channel value being used in the WFD wireless communication (step S205). The control unit 11 determines whether or not the channel to be used in the Wi-Fi communication is the same as the channel being used in the WFD communication (step S210) and, if they are different, controls the wireless communication unit 10 to switch the currently used channel to the channel used in the Wi-Fi communication to restart the WFD communication (step S215). The wireless communication unit 10 switches the channel to the same channel as that in the Wi-Fi communication and restarts the WFD communication. As a result, the connection between the printer 1 and the smartphone 3 is disconnected. The smartphone 3 stores a Service Set Identifier (SSID) or a Basic Service Set Identifier (BSSID) provided before the disconnection and/or the channel value provided at the connection and, after the WFD connection to the printer 1 is disconnected, the smartphone 3 sequentially scans a plurality of channels to search for a channel on which the SSID or the BSSID of the printer 1 exists. The smartphone 3 then reconnects itself to the printer 1 on the channel in which the SSID or the BSSID of the printer 1 is found.

If it is determined at step S210 that the channel for the Wi-Fi communication is the same as the channel for the WFD communication, the control unit 11 neither changes the channel for the WFD communication nor restarts it. Therefore, the wireless communication unit 10 can maintain the WFD connection to the smartphone 3 without causing any undesirable disconnection thereof. Further, the WFD communication is started up using the previously connected channel, even when the Wi-Fi connection has not been established in the process at the WFD startup illustrated in FIG. 2, which results in a higher likelihood of having Yes-determination at step S210 in the process in the WFD connection of FIG. 3 and contributes to a reduction in the disconnection frequency of the WFD communication. The channel has been recorded (overwritten) in the non-volatile memory not only at the WFD startup illustrated in FIG. 2 or during the WFD startup illustrated in FIG. 3 but also at the Wi-Fi connection, and the WFD communication is started up with the recorded channel value, even when there is no Wi-Fi connection at the WFD startup. This allows for a reduction in the disconnection frequency of the WFD communication.

2. Second Embodiment

Figure 4:
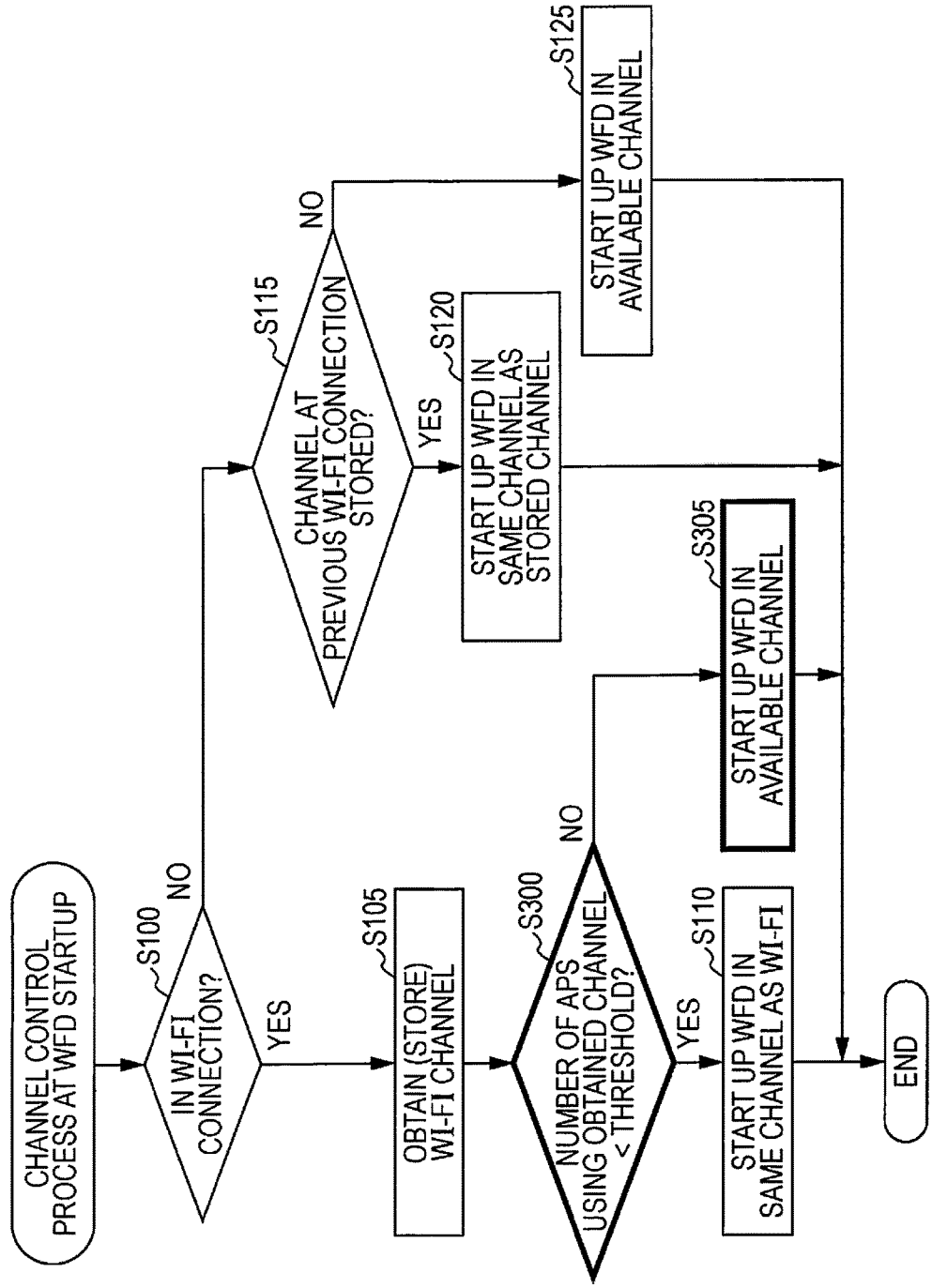
FIG. 4 is a flowchart illustrating a channel control process of a second embodiment.
Figure 5:
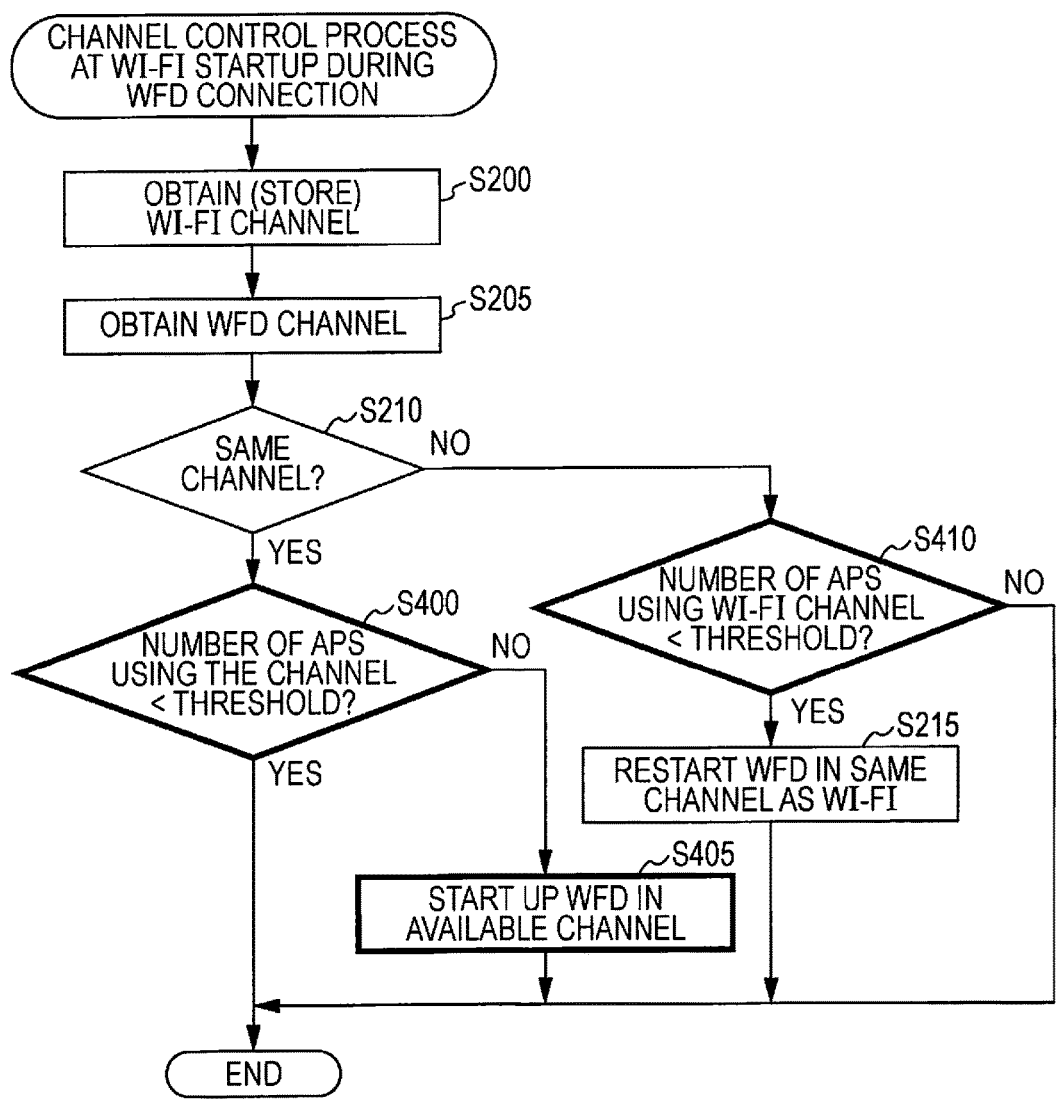
FIG. 5 is a flowchart illustrating a channel control process of the second embodiment.

FIG. 4 illustrates a channel control process at the WFD startup of the second embodiment and FIG. 5 illustrates a channel control process during the WFD connection of the second embodiment. In FIG. 4 and FIG. 5, different steps from those in the first embodiment are depicted in bold lines. The steps the same as those in the first embodiment are provided with the same numbers and description thereof will be omitted. In the second embodiment, a condition determination regarding the likelihood of congestion of the channel used in a Wi-Fi communication is provided when the channel for the WFD communication is set to the same channel as that for the Wi-Fi communication, and the channel for the WFD communication is set to the same channel as that for the Wi-Fi communication when the likelihood of congestion is low. This feature is what makes the second embodiment different from the first embodiment. Following specific descriptions will be provided by using the flowcharts.

In the channel control process at the WFD startup illustrated in FIG. 4, the control unit 11 determines whether or not the number of other APs which use the same channel as the Wi-Fi channel obtained at step S105 is less than a predetermined threshold (step S300). For example, communication in the channel is expected to be congested when there are a plurality of APs other than the AP 2 around the printer 1 and some of these other APs are using the same channel as the AP 2. The threshold is thus set in advance and, when the number of other APs which use the same channel as the AP 2 is greater than or equal to the threshold (that is, if it is determined to be No at step S300), the control unit 11 causes the wireless communication unit 10 to start up the WFD communication in an available channel (step S305). For example, when the eleventh channel is used for Wi-Fi communication, the first channel which is far from (the frequency band of which is away from) the eleventh channel is allocated as the available channel for the WFD communication.

That is, in this case, the Wi-Fi communication and the WFD communication are time-division-multiplexed by the wireless communication unit 10 on different channels. Even when the channels used in the Wi-Fi communication are congested, WFD communication can be performed in the time period allocated to the WFD channel, which can prevent a significant decrease in the transmission speed of the WFD communication.

Note that the channel information, the SSID, and the like used by other surrounding APs are contained in a beacon that is periodically transmitted by these other APs. The wireless communication unit 10 is able to receive the beacon and pass the channel information, the SSID, and the like contained in the beacon to the control unit 11. As a result, based on the beacon, the control unit 11 is able to obtain the number of other APs which use the same channel.

Subsequently, the channel control process during the WFD connection of FIG. 5 will be described. In the process of FIG. 5, if it is determined at step S210 that the channel for the Wi-Fi communication is the same as the channel for the WFD communication, the control unit 11 determines whether or not the number of APs which use the channel is less than a predetermined threshold (step S400). For example, when there are a plurality of APs other than the AP 2 around the printer 1 and some of these other APs are using the same channel as the AP 2, the communication in the channel is expected to be congested. The threshold is thus set in advance and, when the number of other APs which use the same channel as the AP 2 is greater than or equal to the threshold (that is, if it is determined to be No at step S400), the control unit 11 causes the wireless communication unit 10 to restart the WFD communication on an available channel (step S405).

If it is not determined at step S210 that the channel for the Wi-Fi communication is the same as the channel for the WFD communication, the control unit 11 determines whether or not the number of APs which use the channel for the Wi-Fi communication is less than a predetermined threshold (step S410) similarly to step S400 and, if the number of the APs is greater than or equal to the threshold, does not change the channel for the WFD communication and continues the WFD connection. If the number of APs which use the same channel as the Wi-Fi communication is less than the threshold at step S410, the control unit 11 causes the wireless communication unit 10 to set the same channel as the Wi-Fi communication to restart the WFD communication in the same channel in a manner similar to that of the first embodiment (step S215). Note that, if it is determined at step S400 that the channel for the Wi-Fi communication is the same as the channel for the WFD communication and the number of the APs in the channel is not greater than or equal to the threshold, the WFD communication is not restarted in a manner similar to that of the first embodiment.

As discussed above, in the second embodiment, if No is determined at step S400 and if No is determined at step S410, the control unit 11 instructs the wireless communication unit 10 to use different channels to perform Wi-Fi communication and WFD communication, respectively. As a result, the wireless communication unit 10 time-division-multiplexes the two different channels.

When the communication in the channel used in the Wi-Fi is congested and when the WFD communication is performed in the channel, the transmission speed of any one of the Wi-Fi communication and the WFD communication is likely to significantly decrease. Thus, in such a case, the embodiment uses the separate channels for the Wi-Fi communication and the WFD communication and causes the wireless communication unit 10 to time-division-multiplex them, which can prevent a significant decrease in the transmission speed of any one of the communications.

3. Another Embodiment

Note that the technical scope of the invention is not limited to the above-described embodiment, but various modifications may of course be applied without departing from the spirit of the invention.

Figure 6:
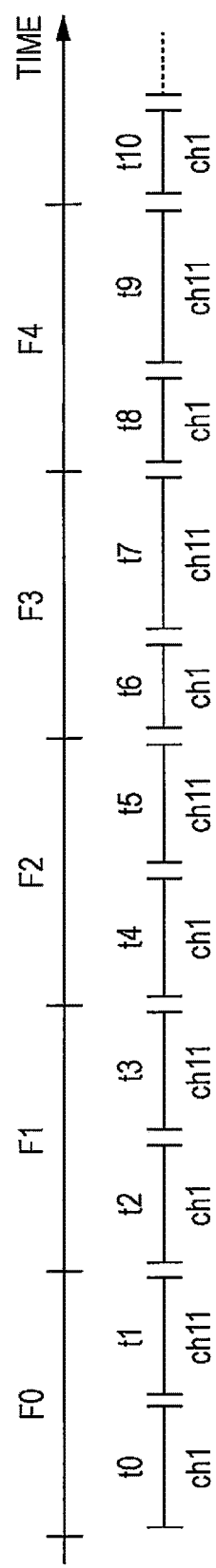
FIG. 6 is a timing chart of another embodiment.

For example, the allocation time period in the time division multiplexing may be controlled to vary depending on the degree of congestion of the communication in each channel. In the second embodiment, it has been described that the WFD communication and the Wi-Fi communication may be performed on different channels. For example, the Wi-Fi communication is performed in the eleventh channel and the WFD communication is performed in the first channel. FIG. 6 illustrates provision of two channel allocation time periods for the first channel and the eleventh channel to each frame Fx of time division multiplexing. In FIG. 6, the communications are allocated to the first channel in even-numbered time periods such as t0, t2, . . . and to the eleventh channel in odd-numbered time periods such as t1, t3, . . . . Note that the length of each frame is constant.

In the period during which no imbalance is determined between the transmission amounts of the respective communications performed in the two channels, the allocation time period for each channel is controlled to be constant by the wireless communication unit 10 as depicted in t0 to t5 of FIG. 6. That is, each allocation time period is controlled to be the same in each frame Fx. Then, when a ratio of the transmission amount of any one of the channels to the total transmission amount of both channels within one frame increases over a predetermined reference value, the allocation time period of the increased channel may be increased in the next frame. For example, when the ratio of the transmission amount of the eleventh channel in the frame F2 to the total transmission amount of the eleventh and first channels in the frame F2 exceeds a predetermined reference value, the ratio of the length of the allocation time period t7 for the eleventh channel to the length of one frame may be increased, as depicted in the frame F3. The fact that the ratio of the allocation time period t7 for the eleventh channel increases means that the ratio of the allocation time period t6 for the first channel decreases. In this way, the allocation time period for each channel is made variable in accordance with the degree of congestion of the communication in each channel in time division multiplexing, which allows for efficient communication in each channel. Note that, even when the ratio of the transmission amount of the eleventh channel to the total transmission amount in the frame F2 is 100% (that is, there is no communication of the first channel in the frame F2), the allocation time period for the first channel in the frame F3 is not set to zero (because the communication in the first channel is performed after the frame F3).

Note that the wireless communication supportable by the wireless communication unit 10 is not limited to the 2.4 GHz band of IEEE802.11n that has been described as an example in the above-described embodiments. Further, the wireless communication unit 10 may be able to time-division-multiplex three or more channels.

Note that the configuration of the wireless communication unit and the assignment of responsibilities between the control unit and the wireless communication unit illustrated in the above-described embodiments are mere examples and not limited to what is described in the above-described embodiments.

Moreover, while the printer has been exemplified as the wireless communication device of the invention in the above-described embodiments, the invention is applicable to any device such as a scanner, a multifunction printer, a smartphone, a tablet terminal, a personal computer, and the like as long as it has not only a wireless communication function interposing a relay device but also a wireless communication function of a P2P system not interposing the relay device.

What is claimed is:

1. A wireless communication device comprising:
   a wireless communication circuit that performs a plurality of wireless communications by switching the wireless communications by performing time division multiplexing of channels used for the wireless communications; and
   a processor that causes the wireless communication circuit to perform a first wireless communication for wirelessly communicating via a relay device which is different from the wireless communication device and a second wireless communication for wirelessly communicating with a wireless terminal through a Peer to Peer system,
   the wireless communication circuit performing the time division multiplexing of a first channel and a second channel, the first channel corresponding to the first wireless communication, the second channel corresponding to the second wireless communication,
   wherein the wireless communication circuit determines a length of an allocation time period to be allocated to at least one of the first channel and the second channel according to both a transmission amount of data of the first channel and a transmission amount of data of the second channel during performing of the time division multiplexing, and switches between the first channel and the second channel according to the determined allocation time period, and
   the wireless communication circuit obtains the transmission amount of data of the first channel in a first frame and the transmission amount of data of the second channel in the first frame, and determines the length of the allocation time period to be allocated to the second channel for a second frame next to the first frame based on the obtained transmission amount of data of the first channel and the obtained transmission amount of data of the second channel, and the first and second frames are not frames for WiMAX.

2. The wireless communication device according to claim 1, wherein the processor is configured to:
   when a connection to the relay device through the first wireless communication is newly established in a state where a connection to the wireless terminal through the second wireless communication has been established and when the second channel being used in the second wireless communication is different from the first channel to be newly used in the first wireless communication, cause the wireless communication circuit to switch the second channel to be used in the second wireless communication to the same channel as the first channel to be used in the first wireless communication; and when the connection to the relay device through the first wireless communication is newly established in the state where the connection to the wireless terminal through the second wireless communication has been established and when the second channel being used in the second wireless communication is the same as the first channel to be newly used in the first wireless communication, cause the wireless communication circuit to maintain the connection to the wireless terminal without resetting the second channel to be used in the second wireless communication.

3. The wireless communication device according to claim 2, wherein the processor is configured to:

record a value of the first channel to be used in the first wireless communication when the first wireless communication is performed; and when the connection to the wireless terminal through the second wireless communication is newly established in a state where the connection to the relay device through the first wireless communication is temporarily disconnected, control the wireless communication circuit to perform the second wireless communication on the same channel as indicated by the value.

4. The wireless communication device according to claim 1, wherein the processor is configured to:

when it is determined that a communication on the first channel to be used in the first wireless communication is not congested to a predetermined threshold or higher, control the wireless communication circuit to use the same channel as the first channel to be used in the first wireless communication and perform the second wireless communication; and when it is determined that the communication on the first channel to be used in the first wireless communication is congested to the threshold or higher, control the wireless communication circuit to use a different channel from the first channel to be used in the first wireless communication and perform the second wireless communication.

5. The wireless communication device according to claim 1, wherein, when performing the time division multiplexing of a plurality of channels that include the first channel and the second channel, the wireless communication circuit is configured to:

when a ratio of a transmission amount within a current frame of one of the plurality of channels to a total transmission amount within the current frame of all the plurality of channels increases to a predetermined reference value or higher, increase a ratio of an allocation time period for the one of the plurality of channels within a next frame to a whole time period of the next frame.

6. A wireless communication method of a wireless communication device that switches a plurality of wireless communications by performing time division multiplexing of channels used for the wireless communications and performs a first wireless communication for wirelessly communicating via a relay device which is different from the wireless communication device and a second wireless communication for wirelessly communicating with a wireless terminal through a Peer to Peer system, the method comprising:

performing the time division multiplexing of a first channel and a second channel, the first channel corresponding to the first wireless communication, the second channel corresponding to the second wireless communication, the performing of the time division multiplexing including determining a length of an allocation time period to be allocated to at least one of the first channel and the second channel according to both a transmission amount of data of the first channel and a transmission amount of data of the second channel, and switching between the first channel and the second channel according to the determined allocation time period, and the performing of the time division multiplexing including obtaining the transmission amount of data of the first channel in a first frame and the transmission amount of data of the second channel in the first frame, and determining the length of the allocation time period to be allocated to the second channel for a second frame next to the first frame based on the obtained transmission amount of data of the first channel and the obtained transmission amount of data of the second channel, the first and second frames being not frames for WiMAX.

7. The wireless communication device according to claim 1, wherein a first frame of the time division multiplexing includes a first time period to be allocated to the first channel and a second time period to be allocated to the second channel, and the wireless communication circuit varies the length of the allocation time period to be allocated to the at least one of the first channel and the second channel in a second frame that is subsequent to the first frame, based on the transmission amount of the data of the at least one of the first channel and the second channel in the first frame.

8. The wireless communication device according to claim 1, wherein the wireless communication circuit varies the length of the allocation time period to be allocated to the at least one of the first channel and the second channel based on the transmission amount of data of the first channel and the transmission amount of data of the second channel.

9. The wireless communication device according to claim 1, wherein the wireless communication circuit varies the length of the allocation time period to be allocated to the at least one of the first channel and the second channel based on a ratio of one of the first channel and the second channel in a frame.

10. The wireless communication device according to claim 1, wherein during performing of the time division multiplexing, the wireless communication circuit varies a first length of the allocation time period to be allocated to one of the first channel and the second channel in a frame based on a transmission amount of data of the one of the first channel and the second channel, and varies a second length of the allocation time period to be allocated to the other of the first channel and the second channel in the frame without varying a length of the frame, depending on the varied first length.

11. The wireless communication device according to claim 1, wherein
the first wireless communication is a Wi-Fi wireless communication, and the second wireless communication is a Wi-Fi Direct wireless communication.

12. The wireless communication device according to claim 1, wherein
the wireless communication device is a printer.

* * * * *